Nov. 3, 1936.  A. THOMAS  2,059,293
SENSING PIN BOX FOR RECORD CARD CONTROLLED STATISTICAL MACHINES
Filed Jan. 11, 1933  8 Sheets-Sheet 1

Fig.1.

Inventor:
A. THOMAS
Per: Sydney L. Page.
Attorney.

Fig.1A.

Nov. 3, 1936.    A. THOMAS    2,059,293
SENSING PIN BOX FOR RECORD CARD CONTROLLED STATISTICAL MACHINES
Filed Jan. 11, 1933    8 Sheets-Sheet 3

Fig. 2.

Inventor:
A. THOMAS
per: Sydney A. Page.
Attorney.

Fig. 2A.

Nov. 3, 1936.   A. THOMAS   2,059,293
SENSING PIN BOX FOR RECORD CARD CONTROLLED STATISTICAL MACHINES
Filed Jan. 11, 1933   8 Sheets-Sheet 6

Nov. 3, 1936.                A. THOMAS                2,059,293
SENSING PIN BOX FOR RECORD CARD CONTROLLED STATISTICAL MACHINES
                Filed Jan. 11, 1933       8 Sheets-Sheet 7

Inventor:
A. Thomas.

Nov. 3, 1936.   A. THOMAS   2,059,293
SENSING PIN BOX FOR RECORD CARD CONTROLLED STATISTICAL MACHINES
Filed Jan. 11, 1933   8 Sheets-Sheet 8

Inventor:
A. Thomas
Per Sydney K. Page.
Attorney.

Patented Nov. 3, 1936

2,059,293

UNITED STATES PATENT OFFICE 2,059,293

SENSING PIN BOX FOR RECORD CARD CONTROLLED STATISTICAL MACHINES

Arthur Thomas, Wallington, England, assignor to The Accounting and Tabulating Corporation of Gt. Britain Limited Application January 11, 1933, Serial No. 651,206
In Great Britain February 12, 1932

16 Claims. (Cl. 209—110)

This invention relates to analyzing mechanism for record card controlled statistical machines, more particularly for machines for sorting record cards.

Hitherto in such machines the sensing pins have been carried in a frame which was reciprocated vertically from a source of power to cause the pins to sense the cards. In such constructions the weight of the reciprocating parts was considerable and consequently the maximum speed at which the machine could be run was limited.

Further, to obtain accurate location and movement of the reciprocating frame containing the sensing pins, adequate guides had to be provided at each end of the frame and eccentrics or similar mechanism provided at each end of the frame with suitable mechanism for driving them.

Further, in sorting machines provided with these pin boxes, it was necessary to provide either beneath the sensing pins or above them, transmission members to which the movement of the sensing pins was imparted in order to operate the parts of the machine to be controlled.

In some constructions of sorting machines, a plunger bed was disposed beneath the sensing pins, containing as many plungers as there were sensing pins, these plungers being connected through Bowden cables to the mechanism to be controlled. Where a plunger bed of the form described above was employed, this plunger bed had to be mounted to slide so that it could be set under any column of the card.

The object of the present invention is to simplify the construction of analyzing mechanism for sensing record cards and to obviate the necessity for providing transmission means above and below the cards as well as to do away with the reciprocating pin box frame and the attendant mechanism for operating it, so as to keep the card free from the operating mechanism for the pins.

According to the present invention analyzing mechanism for statistical cards comprises a plurality of sensing elements, stationary guides through which the sensing elements pass, means for reciprocating the sensing elements in the stationary guides, and means whereby the relative movement occurring between those sensing elements which have passed through holes in a card and those sensing elements which have been arrested by the card, causes those sensing elements which have passed through holes in a card to become locked to a positive operating means, whereby the elements which have become locked are caused to transmit movement to mechanism which is required to be actuated.

Preferably the reciprocating driving member is disposed outside the plane of the sensing elements and an operative connection is provided between each sensing element and the driving member so that each sensing element is operated from the driving member through its own individual connecting means.

In order that the invention may be more clearly understood, it will now be described with reference to the accompanying drawings as applied to the pin box of a machine for sorting statistical record cards, the sorting being effected on one column of the card only at one time.

In the accompanying drawings—

The present invention relates only to the analyzing mechanism of the machine, each sensing pin being connected by a cable 24 to setting mechanism indicated generally at B for the shutter C of a sorting compartment D. The setting mechanism B as illustrated forms the subject matter of my co-pending U. S. patent application Ser. No. 651,207 filed January 11, 1933, but for the purposes of disclosure, it is sufficient to state that the setting mechanism may be of the kind described in Lasker's U. S. patent specification No. 1,315,370.

In the construction about to be described the pin box comprises a frame 1 which is fixed in the machine during a sorting operation although, as will be described later, its position in the machine can be adjusted in accordance with the particular card column on which sensing is to be effected. Mounted in this frame is a set of sensing pins or feelers 2 of which the upper ends pass through holes in a plate 3 forming part of the frame 1, while their lower ends pass through guides formed in brackets 4 depending from the plate. The pins can thus move vertically up and down in the stationary pin box frame. It will be understood that there will be as many pins as there are index positions in a card column, and that the pins will be spaced according to the spacing of the index positions.

Figure 1:
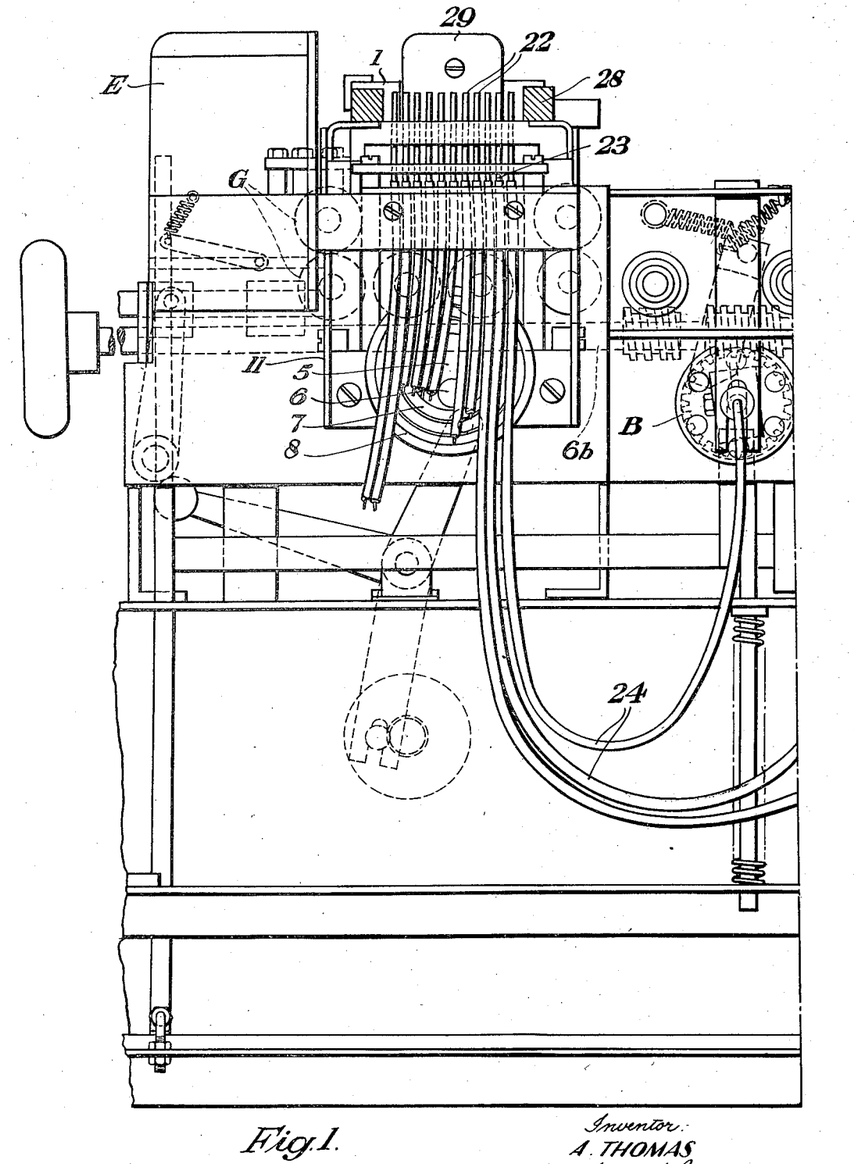
Figs. 1 and 1A show the sorting machine in elevation.
Figure 1A:
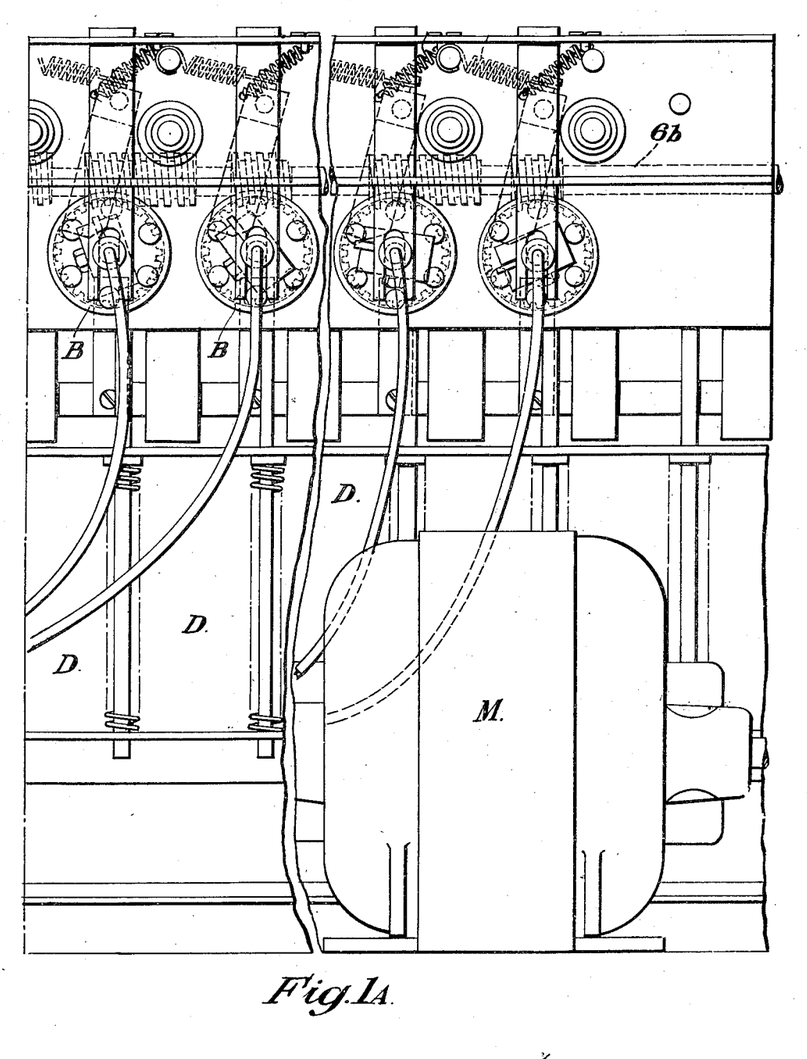
Figure 2:
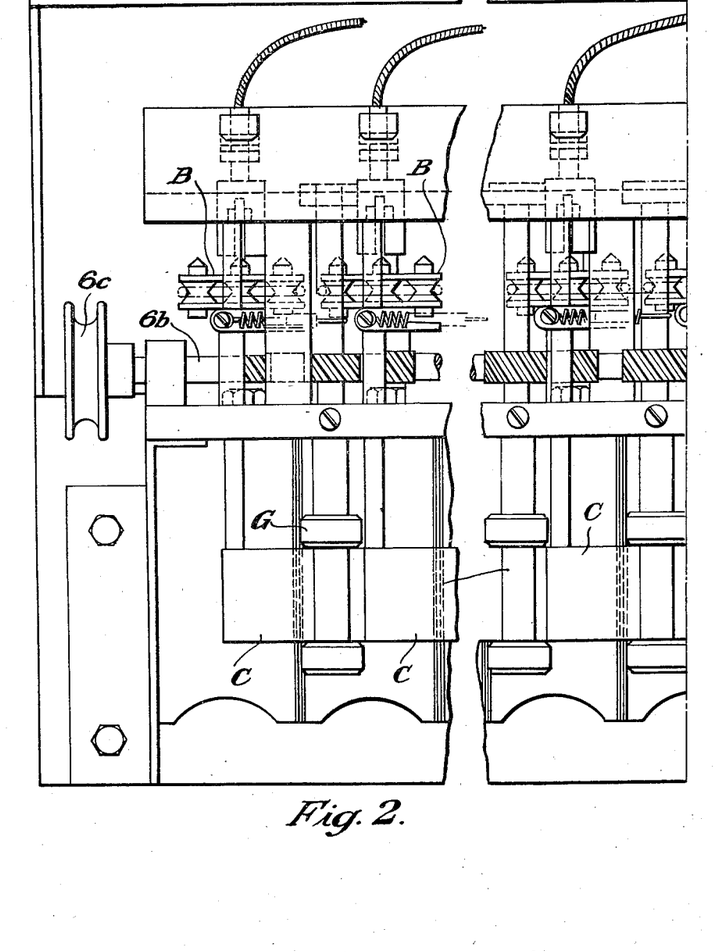
Figs. 2 and 2A show the machine in plan.
Figure 2A:
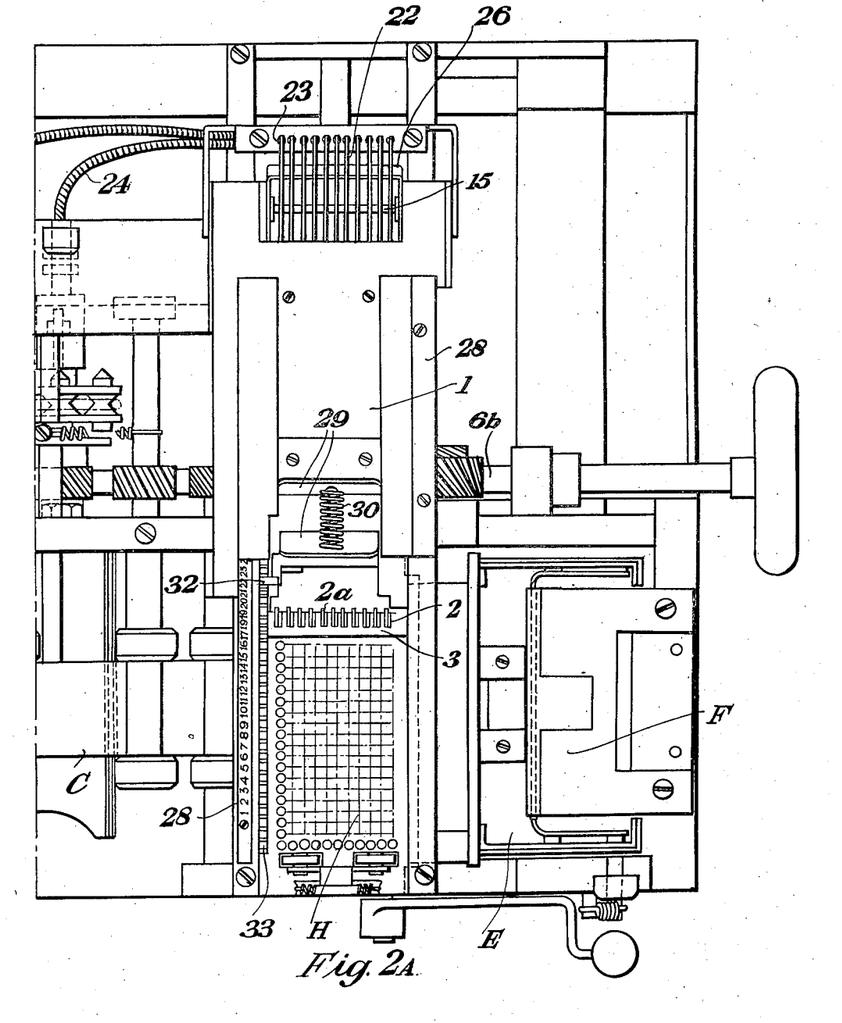

The cards to be sorted are stacked in a magazine E (Figs. 1 and 2A) from which they are fed by means of a picker F (Fig. 2A) and feed rolls G to the pin box. The card feeding means may be of the form described in Lasker's U. S. patent specification No. 1,298,971. Beneath the sensing pins are disposed the usual perforated sensing plates H.

The sensing pins are reciprocated from an eccentric through the agency of the following mechanism.

Figure 3:
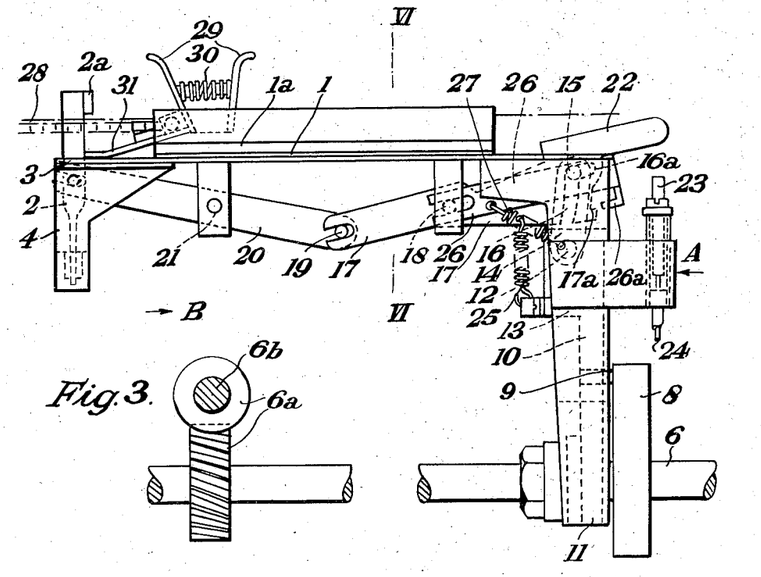
Fig. 3 shows the mechanism in cross sectional elevation.
Figure 8:
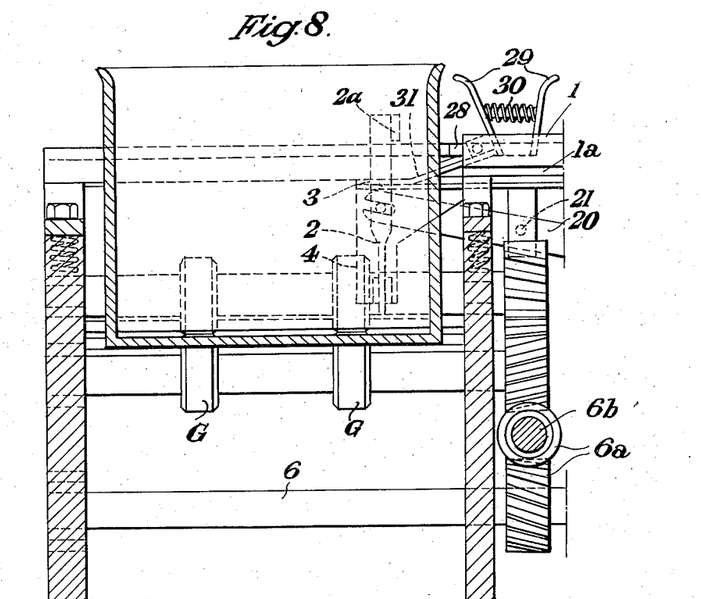
Figs. 8 and 8A together show a cross sectional elevation of the mechanism in position in the frame of a sorting machine.
Figure 8A:
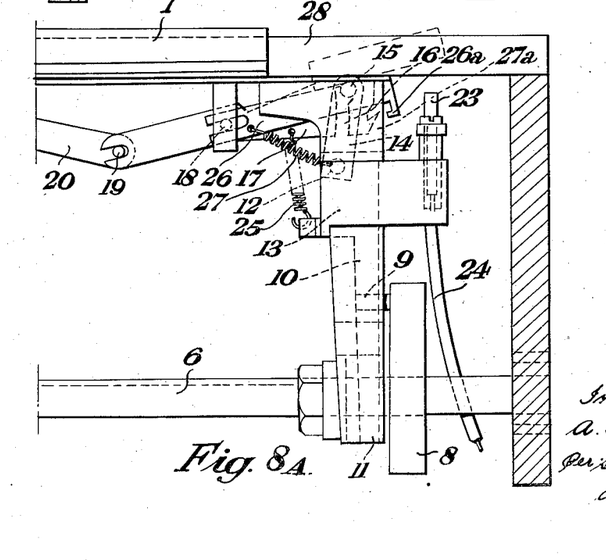

The eccentric comprises an eccentric sheave 5 secured to a driving shaft 6 and an inner strap 7 surrounded by an outer strap 8 carrying a projecting pin 9, which enters a hole in a vertically sliding block 10. The shaft 6 is driven from a motor M through skew gearing 6a (Figs. 3 and 8) from a main shaft 6b carrying a pulley 6c (Fig. 2) driven from the motor M by a belt. The block 10 carries guide bars 10a which run in guide holes formed in a fixed frame 11, and as the eccentric 5 rotates the block 10 reciprocates with respect to the frame 11. At the upper end of the block 10 is a cross rod 12 mounted in supports 13 (Figs. 3, 4, 6, and 8A) and carrying pivoted to it a stirrup 14. The free ends of this stirrup are connected by a second transverse rod 15 passing through arcuate slots 16 formed in a series of actuating levers 17, there being an actuating lever associated with each sensing pin 2. The actuating levers are pivoted between their ends on a rod 18 to the fixed frame 1 of the pin box and at their ends remote from the stirrup 14 they are pivoted by a pin and slot connection 19 to a corresponding series of connecting levers 20 likewise pivoted between their ends to the pin box frame at 21. The opposite ends of these connecting levers are pivoted by pin and slot connections to their respective sensing pins.

The ends of the actuating levers 17 adjacent the stirrup 14 are provided with striker heads 22 each adapted to engage and depress a plunger 23 located beneath it, each plunger being connected conveniently by a Bowden cable 24 to the setting mechanism for a particular compartment in the sorting machine. Such setting mechanism may be of any well known kind (e. g. that described in Lasker's U. S. patent specification No. 1,315,370) and need not be described here as it forms no part of the present invention.

Springs 25 are provided which tend to pull the actuating levers 17 about their pivots 18 in a direction to bring the striker heads 22 down on to the plungers 23, and this movement of the actuating levers also causes the respective sensing pins 2 to move downward on to the card to sense it. The upward movement of the pins is effected positively by the transverse rod 15 engaging the upper ends of the arcuate slots 16 in the actuating levers 17 during the upstroke of the stirrup 14 carried by the sliding block 10.

Figure 4:
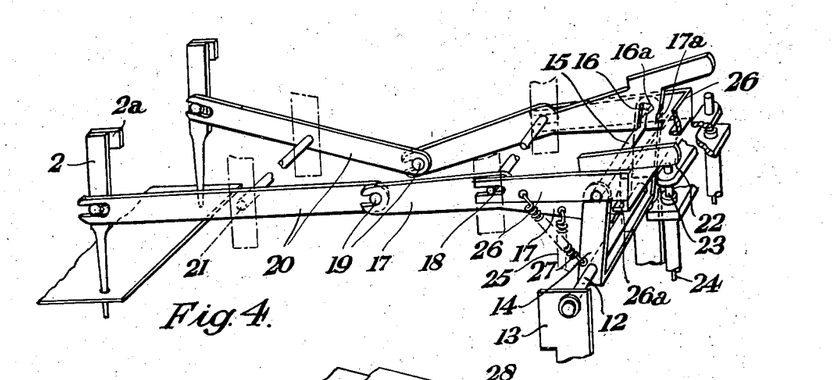
Fig. 4 is a perspective view showing the parts associated with two sensing pins of which one has sensed a hole while the other has not.
Figure 5:
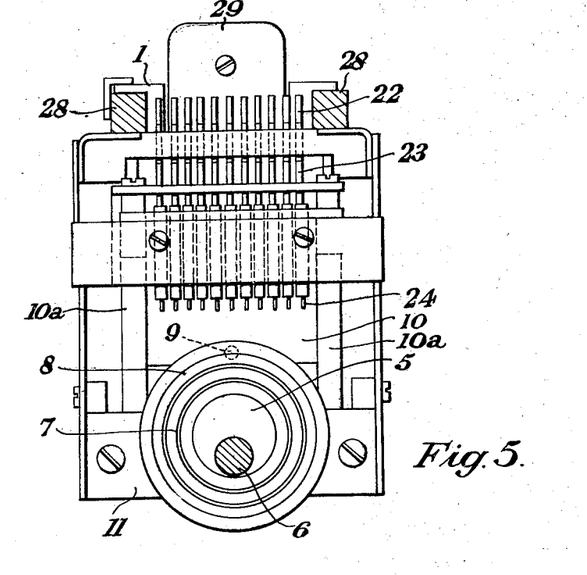
Fig. 5 is an end elevation of the mechanism looking in the direction of the arrow A in Fig. 3.
Figure 6:
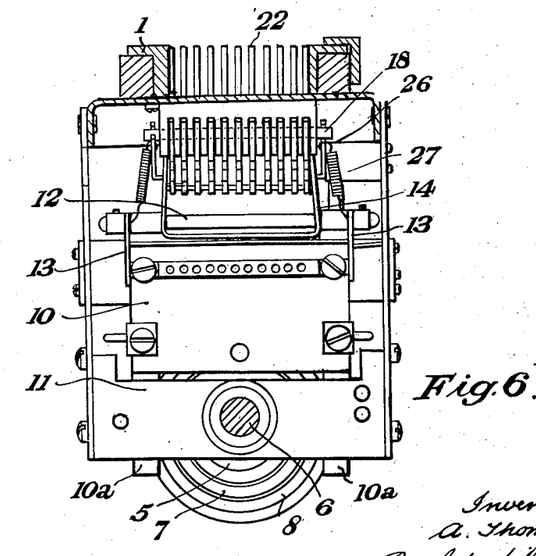
Fig. 6 is an end view in the direction of the arrow B in Fig. 3, parts to the left of the line VI—VI in Fig. 3 being omitted in Fig. 6.
Figure 7:
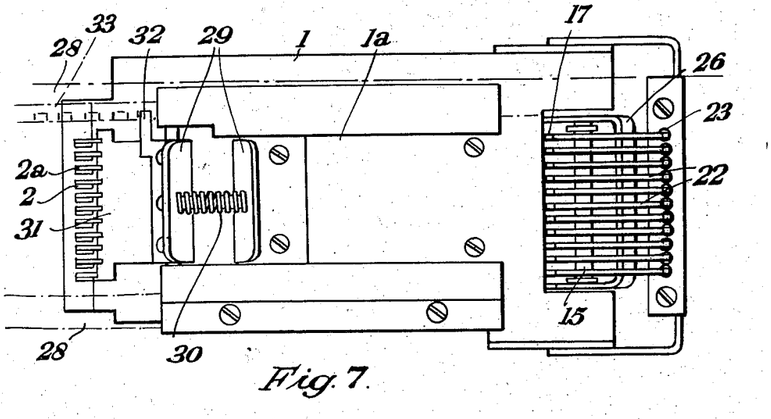
Fig. 7 is a plan of the mechanism.

In order to lock the pins which have passed through the card and to operate them positively a stirrup member 26 is provided pivoted as shown in Fig. 4 on the rod 15, and having the free ends of its arms slotted to engage with the pivot rod 18 for the actuating levers 17. The rod 15 connecting the arms of the stirrup member 14 passes freely through the arms of the stirrup member 26 thus connecting it through the stirrup member 14 to the sliding block 10. In addition, the upper ends of the arcuate slots 16 in the actuating levers are widened to form a short lateral slot 16a running at right angles to the arcuate slot at its upper end. The stirrup member 26 is provided with a spring 27 which pulls it so that when the sensing pins are raised the transverse rod 15 passing through its arms lies in the short slots 16a at the top of the arcuate slots 16 in all the actuating levers 17.

The operation is as follows:—

Assuming the sensing pins 2 to be raised, the eccentric 5 revolves and lowers the sliding block 10 driven thereby, thus bringing down the stirrup member 26 and the transverse rod 15 passing through its arms. The springs 25 attached to the actuating levers 17 cause these levers to follow this downward movement thereby lowering the sensing pins 2 also until those pins which find no hole in the card engage with the surface of the card. Up to this point in the movement the spring 27 attached to the stirrup member 26 maintains the transverse rod 15 in engagement with the short lateral slots 16a at the upper ends of the arcuate slots 16 in the actuating levers 17. If, however, one pin 2 passes through a hole in the card while the other pins are held up by the card the corresponding actuating lever 17 will also continue to move down while the other actuating levers will be held up. The rod 15 will continue to move down but will be forced by the slots 16 in the arrested levers 17 to swing toward the left in Fig. 3. The stirrup 26 will partake of both the leftward and downward motion of the rod, the former against the tension of the spring 27.

The leftward movement of the stirrup member 26 brings a ledge or shoulder 26a formed on the member joining its arms into engagement with a notch or shoulder 17a formed on the actuating lever 17 associated with the pin 2, which has passed through the card whereby when the striker head 22 on this actuating lever engages with the plunger 23 disposed beneath it, the stirrup member 26 positively causes it to continue its downward movement, thereby depressing the plunger and actuating the Bowden cable 24 to operate the associated shutter mechanism for the compartment which is to receive the card. The stirrup member 26, therefore, constitutes a driving member acting positively to convey the movements of the pins, which find holes, to the mechanism to be operated.

On the return upward stroke of the sliding block 10 operated from the eccentric 5, the stirrup member 26 is raised and the transverse rod 15 by engaging with the upper end of the arcuate slot 16 lifts the actuating lever 17 which has operated the Bowden cable 24 and returns it to its uppermost position. During the upward movement of the transverse rod 15 it also picks up the actuating levers 17 of the pins 2 which have been held up by the card and returns them to their uppermost position. As soon as all the actuating levers 17 have reached their uppermost positions the spring 27 attached to the stirrup member 26 returns it to its initial position, whereby the rod 15 is caused to follow the right hand profile of the cam slots 16a at the upper ends of the arcuate slots 16 in the actuating levers 17.

If all the pins 2 are held up by a blank card the stirrup member 26 will perform the same movement as before under the action of its spring 27, but its ledge 26a will not engage with any of the notches 17a in the actuating levers 17 since the position of these notches is such that when the actuating levers are held up, the notches are always above the ledge 26a on the stirrup member 26 at any moment when the stirrup member moves under the action of its spring 27. Consequently, none of the Bowden cables will be operated.

Alternatively, if no card is in the machine, all the pins move downward until their striker heads 22 meet the corresponding operating plungers 23. Each Bowden cable 24 has a return spring (not shown) which is stronger than the spring 25 controlling the corresponding actuating lever 17, so that if no pin is lifted all the pins follow the rod 15 until they all simultaneously meet the plungers 23 when they will be held up by the plungers 23 so that the ledge 26a of the stirrup member 26 will pass clear of the notches 17a in the lever 17.

It will thus be seen that the ledge 26a on the stirrup member 26 only engages with the notches 17a in the actuating members when relative movement occurs between the sensing pins 2 owing to one or more pins passing through holes in a card while the remainder are held up.

In order that the sensing pins 2 may be moved to register with any card column on which it is desired to sense, the pin box frame 1 is slidably mounted on rails 28 in the frame of the machine and the driving eccentric 5 is connected to its shaft 6 by a long keyway and feather. Mounted on the top plate 1a of the pin box are two pivoted finger plates 29 connected by a compression spring 30. The lower end of one finger plate carries a second plate 31 at right angles thereto and adapted to engage under heads 2a on the sensing pins and raise them clear of the card when the two finger plates 29 are pressed together. With the pins 2 in this raised position the pin box frame 1 can be moved along its guides 28 and set with the pins over any card column. The finger plate carrying the pin raising plate 31 is also provided with a projection 32 which engages with a fixed rack 33 when the finger plates are released and thereby locks the pin box in the position to which it has been set.

It will be appreciated that the construction of pin box according to the invention renders it possible to move the pin box for setting purposes without first turning the main shaft of the machine until the pins are raised clear of the card, so that the pin box can readily be moved whether there are cards in the sensing chamber or not.

Further, the pin box does not reciprocate as in previous constructions, the pins only moving in a stationary frame. This frame does not move while the machine is running and since it has no moving parts it gives a more rigid location of the sensing pins.

The pin box according to the invention may be modified, if desired, to sense double punched cards, i. e. cards which have two holes punched in the same column, these two holes combined indicating a particular recorded value.

In one convenient system of double punching a hole in any of the positions 0 to 11 indicates a particular value, while a hole in any of these positions together with a hole in the 12 position in the same column indicates a different value.

Figure 9:
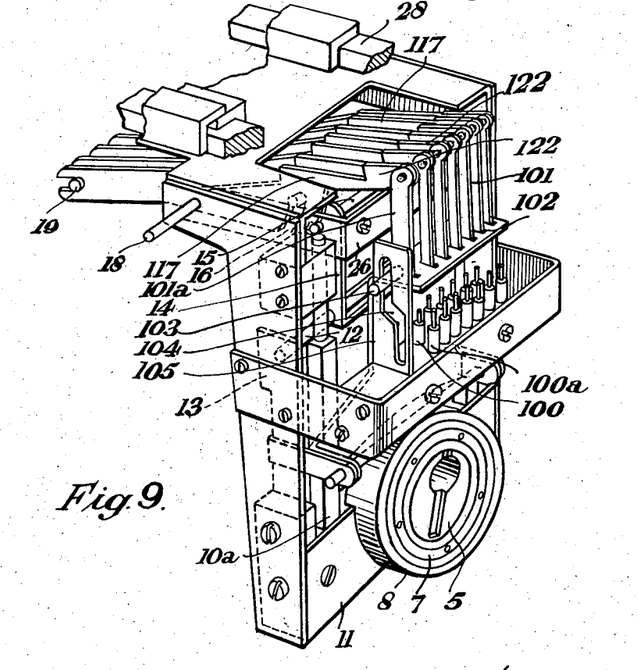
Fig. 9 is a perspective view of part of a modified construction for analyzing double punched cards.

Such a modified form of pin box is illustrated in Fig. 9 of the drawings, in which parts similar to those already described are given the same reference characters.

In this modified form of pin box according to the invention, two sets of Bowden cable plungers adapted to be operated from the pins, are provided, and when there is no hole in the 12 position the pins act on one set of these members, whereas sensing a hole in the 12 position causes the pins to act on the other set of plungers.

Conveniently two Bowden cable plungers 100 and 100a are provided for each of the pins corresponding to the positions 0 to 11, these plungers being disposed in two parallel rows. The striker heads 22 on the actuating levers 17 of the pins corresponding to the positions 0 to 11 carry depending pivoted links 101, of which the lower ends pass through a shutter 102 which is normally in a position which maintains the lower ends of these pivoted links over the plungers 100 of one row.

The striker head 122 on the actuating member 117 for the 12 pin has also a depending pivoted link 101a passing through the shutter 102 and said link is provided with a laterally projecting pin 103 passing through a cam slot 104 in a fixed plate 105. When the 12 pin senses a hole, the striker head 122 descends and the link 101a attached thereto descends with it, whereby the projecting pin 103 on this link moves in the cam slot 104 whereby the link 101a is swung, and in swinging moves the shutter 102 so that the other depending links 101 are brought over the plungers 100a in the second row. Thus, if a card having a hole in the 12 position and a hole in another position in the same column is sensed, the shutter 102 is swung over and the depending link 101 corresponding to the record hole actuates its corresponding plunger 100a in the second row instead of corresponding plunger 100 in the first row.

It is common practice, where desired, to attach counters to statistical card sorters, and it is obvious that such counters may if desired be operated or controlled by the Bowden cables 24, and in general that these cables are not limited in their application to the particular devices B illustrated in the drawings.

It will be appreciated that the construction according to the invention, whereby the pins do not operate directly the Bowden cables, is very convenient in cases where more than one apparatus is to be actuated by each pin, since the Bowden cables are disposed away from the pins and the card, and more room is available around the card for other parts of the machine.

In previous machines, when it was desired to have no Bowden cables or other transmission members actually beneath the card, it was necessary to dispose these on top of the pin box. In the construction according to the invention this is not necessary, since all the transmission mechanism is located at one end of the pin box mechanism.

A further advantage provided by the construction according to the invention is that it is not necessary to provide accurately machined guides for the pin box, as was necessary when the pin box itself was reciprocated.

Further, any pins which may stick between their two end positions are automatically restored to the normal position before commencing on the next stroke.

For convenience of description the record sensed by the described mechanism has been called a "card", but it will, of course, be understood that said record may have other forms as, for example, that of a tape.

What I claim is:—

1. Analyzing mechanism for statistical cards comprising a plurality of sensing elements, guides through which the sensing elements pass, said guides being stationary during the operation of the machine, means for reciprocating the sensing elements in the stationary guides, positive, operating mechanism and means whereby relative movement between those sensing elements which have passed through holes in a card and those which have been arrested by the card, causes the elements which have passed through the holes to become locked to said positive operating mechanism, whereby the movements of the elements which have become locked are transmitted positively to mechanism which is required to be actuated.

2. Analyzing mechanism for statistical cards comprising a plurality of sensing elements, guides through which the sensing elements pass, said guides being stationary during the operation of the machine, a reciprocable driving member disposed outside the plane of the sensing elements, an operative connection between each sensing element and the driving member, and means whereby relative movement between those sensing elements which have passed through holes in a card and those which have been arrested by a card causes the elements which have passed through holes to become locked to the driving member, whereby movements of the elements which have become locked are transmitted positively to mechanism which is required to be actuated.

3. Analyzing mechanism for statistical cards comprising a plurality of sensing pins, guides through which the sensing pins pass, said guides being stationary during the operation of the machine, a stationary frame, an operating link for each sensing pin pivoted at one end to the pin and pivoted between its ends to the stationary frame, means for oscillating the links in synchronism about the pivots which connect them to the stationary frame, whereby the sensing pins are caused to reciprocate in synchronism within the stationary guides, and means whereby relative movement between those sensing pins which have passed through a hole in a card and those which have been arrested by the card, causes the pins which have passed through the holes to become locked to a positive operating means.

4. Analyzing mechanism for statistical cards comprising a plurality of sensing pins, guides through which the sensing pins pass, said guides being stationary during the operation of the machine, a stationary frame, an operating link for each sensing pin pivoted at one end to the pin and pivoted between its ends to the stationary frame, an actuating lever for each sensing pin, each of said actuating levers being pivoted between its ends to the stationary frame, a pivotal connection between each actuating lever and the corresponding operating link, a frame member disposed to one side of the plane of the sensing pins, means for reciprocating said frame member, and operative connections between all the actuating levers and said frame member, whereby reciprocation of the frame member causes reciprocation of all the sensing pins.

5. Analyzing mechanism for statistical cards, comprising a plurality of sensing pins, guides through which the sensing pins pass, said guides being stationary during the operation of the machine, a stationary frame, an operating link for each sensing pin pivoted at one end to the pin and pivoted between its ends to the stationary frame, an actuating lever for each sensing pin, each of said actuating levers being pivoted between its ends to the stationary frame, a pivotal connection between each actuating lever and the corresponding operating link, a frame member disposed to one side of the plane of the sensing pins, means for reciprocating said frame member, a driving member pivoted to the stationary frame, an operative connection between the driving member and the reciprocating frame member, whereby reciprocation of the frame member causes oscillation of the driving member about its pivot, operative connections between the actuating levers and the driving member, whereby relative movement between the actuating levers corresponding to the sensing pins which have passed through holes in a card and the actuating levers corresponding to the sensing pins which have been arrested by the card, causes the driving member to move longitudinally, and means whereby such longitudinal movement of the driving member about its pivot establishes an operative connection between the driving member and the actuating levers corresponding to the sensing pins which have passed through holes in a card.

6. Analyzing mechanism for statistical cards, comprising a plurality of sensing pins, guides through which the sensing pins pass, said guides being stationary during the operation of the machine, a stationary frame, an operating link for each sensing pin pivoted at one end to the pin and pivoted between its ends to the stationary frame, an actuating lever for each sensing pin, each of said actuating levers being pivoted between its ends to the stationary frame, a pivotal connection between each actuating lever and the corresponding operating link, a frame member disposed to one side of the plane of the sensing pins, means for reciprocating said frame member, a driving member pivoted to the stationary frame, an operative connection between the driving member and the reciprocating frame member, whereby reciprocation of the frame member causes oscillation of the driving member about its pivot, operative connections between the actuating levers and the driving member, whereby relative movement between the actuating levers corresponding to the sensing pins which have passed through holes in a card and the actuating levers corresponding to the sensing pins which have been arrested by the card, causes the driving member to move longitudinally, a projecting ledge carried by the driving member, and a shoulder on each actuating lever so disposed with relation to the ledge on the driving member, that when the driving member moves longitudinally the said ledge moves under the shoulders on the actuating levers corresponding to the sensing pins which have been arrested and above the shoulders of the actuating levers corresponding to the sensing pins which have not been arrested, whereby these last named actuating levers are positively driven owing to the engagement of the ledge on the driving member with their shoulders.

7. The invention set forth in claim 6 wherein each actuating lever is provided with a cam slot and the driving member is in the form of a stirrup carrying a cross bar engaging in all said cam slots, whereby relative movement between said driving member and an arrested actuating lever forces the bar out of the cam slots, thereby causing the stirrup to move longitudinally.

8. The invention set forth in claim 5 wherein each actuating lever is provided with a cam slot and the driving member is in the form of a stirrup carrying a cross bar engaging in all said cam slots, whereby relative movement between said cross bar and an arrested actuating lever forces the bar out of the cam slots, thereby causing the stirrup to move longitudinally.

9. Analyzing mechanism for statistical cards comprising a plurality of sensing elements, guides through which the sensing elements pass, said guides being stationary during the operation of the machine, means for reciprocating the sensing elements in the stationary guides, positive operating mechanism, means whereby relative movement between those sensing elements which have passed through holes in a card and those which have been arrested by the card, causes the elements which have passed through the holes to become locked to said positive operating mechanism, whereby the movements of the elements which have become locked are transmitted to mechanism which is required to be actuated, means for moving the guides and sensing elements longitudinally of the card for the purpose of setting the sensing elements over any card field, means for locking the guides in the set position, perforated sensing plates between which the card is positioned for sensing, and an operative connection between the sensing elements and the locking means for the guides whereby the sensing elements are moved clear of the perforated sensing plates whenever the guides are unlocked and vice versa.

10. Analyzing mechanism for statistical cards, comprising a plurality of sensing pins, guides through which the sensing pins pass, said guides being stationary during the operation of the machine, a stationary frame, an operating link for each sensing pin pivoted at one end to the pin and pivoted between its ends to the stationary frame, an actuating lever for each sensing pin, each of said actuating levers being pivoted between its ends to the stationary frame, a pivotal connection between each actuating lever and the corresponding operating link, a frame member disposed to one side of the plane of the sensing pins, means for reciprocating said frame member, a driving member pivoted to the stationary frame, an operative connection between the driving member and the reciprocating frame member, whereby reciprocation of the frame member causes oscillation of the driving member about its pivot, operative connections between the actuating levers and the driving member, whereby relative movement between the actuating levers corresponding to the sensing pins which have passed through holes in a card and the actuating levers corresponding to the sensing pins which have been arrested by the card, causes the driving member to move longitudinally, a projecting ledge carried by the driving member, a shoulder on each actuating lever so disposed with relation to the ledge on the driving member, that when the driving member moves longitudinally the said ledge moves under the shoulders on the actuating levers corresponding to the sensing pins which have been arrested and above the shoulders of the actuating levers corresponding to the sensing pins which have not been arrested, whereby these last named actuating levers are positively driven owing to the engagement of the ledge on the driving member with their shoulders, means for moving the guides and sensing pins longitudinally of the card for the purpose of setting the sensing elements over any card field, means for locking the guides in the set position, perforated sensing plates between which the card is positioned for sensing, and an operative connection between the sensing elements and the locking means for the guides whereby the sensing elements are moved clear of the perforated sensing plates whenever the guides are unlocked and vice versa.

11. Analyzing mechanism for statistical cards comprising a plurality of sensing elements, guides through which the sensing elements pass, said guides being stationary during the operation of the machine, means for reciprocating the sensing elements in the stationary guides, positive operating mechanism means whereby relative movement between those sensing elements which have passed through holes in a card and those which have been arrested by the card, causes the elements which have passed through the holes to become locked to said positive operating mechanism, whereby the movements of the elements which have become locked are transmitted to mechanism which is required to be actuated, a plurality of transmission members, an operative connection between each sensing element and a transmission member, a control sensing element, means for reciprocating said control sensing element in synchronism with the remaining sensing elements, and operative connections between the control sensing element and all the transmission members, whereby when the control sensing element senses a hole all the transmission members are moved from a normal position to a second position.

12. Analyzing mechanism for statistical cards comprising a plurality of sensing pins, guides through which the sensing pins pass, said guides being stationary during the operation of the machine, a stationary frame, an operating link for each pin pivoted at one end to the pin and pivoted between its ends to the stationary frame, an actuating lever for each pin, each of said actuating levers being pivoted between its ends to the stationary frame, a pivotal connection between each actuating lever and the corresponding operating link, a frame member disposed to one side of the plane of the sensing pins, means for reciprocating said frame member, operative connections between all the actuating levers and said frame member, whereby reciprocation of the frame member reciprocates all the sensing pins, a control sensing pin, an operative connection between said control sensing pin and the frame member, whereby the control sensing pin is reciprocated in synchronism with the remaining sensing pins, a depending bar pivoted to each actuating member, a shutter through which all said bars freely pass, and an operative connection between the control sensing pin and the shutter whereby when the control sensing pin senses a hole the shutter is moved to bring all the depending bars out of a normal position into a different position.

13. Analyzing mechanism for statistical cards comprising a plurality of normal sensing pins and a control sensing pin, guides through which the sensing pins pass, said guides being stationary during the operation of the machine, a stationary frame, an operating link for each sensing pin pivoted at one end to the pin and pivoted between its ends to the stationary frame, an actuating lever for each sensing pin, each of said actuating levers being pivoted between the ends to the stationary frame, a pivotal connection between each actuating lever and the corresponding operating link, a frame member disposed to one side of the plane of the sensing pins, a driving member pivoted to the stationary frame, an operative connection between the driving member and the reciprocating frame member whereby both members move together, operative connections between the actuating members and the driving member whereby relative movement between the actuating members corresponding to the sensing pins which have passed through holes in a card and the actuating members corresponding to the sensing pins which have been arrested by the card causes the driving member to move longitudinally, means whereby such movement of the driving member with respect to its pivot establishes an operative connection between the driving member and the actuating members corresponding to the sensing pins which have passed through holes in a card, a depending bar pivoted to each actuating member, a shutter through which all said bars freely pass, a fixed member having a cam surface formed thereon, a pin on the depending bar corresponding to the control sensing pin, and means for maintaining said pin in engagement with the cam surface whereby when the control sensing pin passes through a hole the shutter is swung to bring all the depending bars out of a normal position into a different position.

14. In card-analyzing mechanism, the combination of a set of feelers situated over the card to be sensed, a set of linkages carrying the movements of said feelers to one side of the card, a reciprocating operating member situated at one side of the card and acting on said linkages, and means acting in each instance to couple said operating member to the linkage of the feeler which in that instance is unobstructed so as to actuate the devices controlled by said sensing mechanism.

15. In a card sorting machine having means for feeding cards from a magazine into a sensing chamber and from said chamber to the shutters for the respective receptacles: an analyzing assembly settable transversely of the card path to enable the desired column of the card to be sensed, and comprising a frame, a set of feelers guided in said frame, linkages connected with the respective feelers and extending transversely and terminating beyond the card-feeding mechanism, and flexible shutter-controlling connections operated by said linkages and arranged beneath their outside ends; and means acting on said linkages to move said feelers toward and from the card in the sensing chamber, and to operate said flexible connections.

16. In a card sorting machine having means for feeding cards from a magazine into a sensing chamber and from said chamber to the shutters for the respective receptacles: an analyzing assembly settable transversely of the card path to enable the desired column of the card to be sensed, and comprising a frame, a set of feelers guided in said frame, linkages connected with the respective feelers and extending transversely and terminating beyond the card-feeding mechanism, and flexible shutter-controlling connections operated by said linkages and arranged beneath their outside ends; and an operating member reciprocating in said frame and acting on said linkages to move said feelers toward and from the card and to operate said flexible connections.

ARTHUR THOMAS.